United States Patent
Ebsen et al.

(10) Patent No.: US 10,509,747 B2
(45) Date of Patent: Dec. 17, 2019

(54) MEMORY ACCESS OPERATION SUSPEND/RESUME

(71) Applicant: Seagate Technology LLC, Cupertino, CA (US)

(72) Inventors: David Scott Ebsen, Minnetonka, MN (US); Dana Lynn Simonson, Owatonna, MN (US); AbdelHakim Alhussien, San Jose, CA (US); Erich Franz Haratsch, San Jose, CA (US); Steven Howe, Rochester, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/982,210

(22) Filed: May 17, 2018

(65) Prior Publication Data

US 2019/0354498 A1    Nov. 21, 2019

(51) Int. Cl.
*G06F 13/26* (2006.01)
*G06F 13/16* (2006.01)
*G06F 9/48* (2006.01)

(52) U.S. Cl.
CPC ............ *G06F 13/26* (2013.01); *G06F 9/4837* (2013.01); *G06F 13/1626* (2013.01); *G06F 13/1642* (2013.01)

(58) Field of Classification Search
CPC .... G06F 13/26; G06F 9/4837; G06F 13/1642; G06F 13/1626
See application file for complete search history.

(56) References Cited

U.S. PATENT DOCUMENTS

| | | | | |
|---|---|---|---|---|
| 5,822,244 A * | 10/1998 | Hansen | ............... | G06F 13/4239 365/185.11 |
| 6,930,925 B2 * | 8/2005 | Guo | ..................... | G11C 16/12 365/185.28 |
| 9,021,158 B2 | 4/2015 | Hyun et al. | | |
| 2002/0188812 A1 * | 12/2002 | Sadhasivan | ......... | G06F 13/4239 711/153 |
| 2014/0095791 A1 * | 4/2014 | Bell, Jr. | ................ | G06F 12/084 711/122 |
| 2016/0154594 A1 * | 6/2016 | Kang | .................... | G06F 3/0619 711/103 |
| 2018/0024772 A1 * | 1/2018 | Madraswala | ......... | G06F 3/0659 711/103 |
| 2019/0065376 A1 * | 2/2019 | Lee | ..................... | G06F 12/0862 |

* cited by examiner

*Primary Examiner* — Idriss N Alrobaye
*Assistant Examiner* — Ronald T Modo
(74) *Attorney, Agent, or Firm* — Holzer Patel Drennan

(57) ABSTRACT

A memory controller manages memory access operations through a flash memory interface of a memory array of a solid-state storage device connected to a host. The memory controller executes a first memory access operation in the memory array. The first memory access operation has a first priority. The memory controller detects a suspending memory access operation available for execution in the memory array and having a higher priority than the first priority. The detection operation distinguishes between suspending memory access operations and non-suspending memory access operations. The memory controller suspends execution of the first memory access operation in the memory array and executes one or more memory access operations having higher priorities than the first priority and being available for execution in the memory array. The memory controller resumes the execution of the first memory access operation in the memory array.

16 Claims, 5 Drawing Sheets

MEMORY ACCESS OPERATION SUSPEND/RESUME

BACKGROUND 3D flash memory involves longer program times than 2D flash memory technologies. The longer program times can be increased by the execution of one shot programming in which multiple memory pages are programmed in a single operation, which can cause significant bottlenecks on busy die. In mixed read/write workloads, the longer program times can create a bottleneck for other higher priority operations. For example, read operations may experience long latency when blocked by a long program operation on a die.

SUMMARY

Implementations disclosed herein provide systems and methods for managing memory access operations through a flash memory interface of a memory array of a solid-state storage device connected to a host. A memory controller executes a first memory access operation in the memory array. The first memory access operation has a first priority. The memory controller detects at least one suspending memory access operation available for execution in the memory array and having a higher priority than the first priority. The detection operation distinguishes between suspending memory access operations and non-suspending memory access operations. The memory controller suspends execution of the first memory access operation in the memory array and executes one or more memory access operations having higher priorities than the first priority and being available for execution in the memory array until no other memory access operations having higher priorities than the first priority are available for execution in the memory array. The memory controller resumes the execution of the first memory access operation in the memory array, responsive to completion of the executing operation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

Other implementations are also described and recited herein.

BRIEF DESCRIPTIONS OF THE DRAWINGS

DETAILED DESCRIPTION

Figure 1:
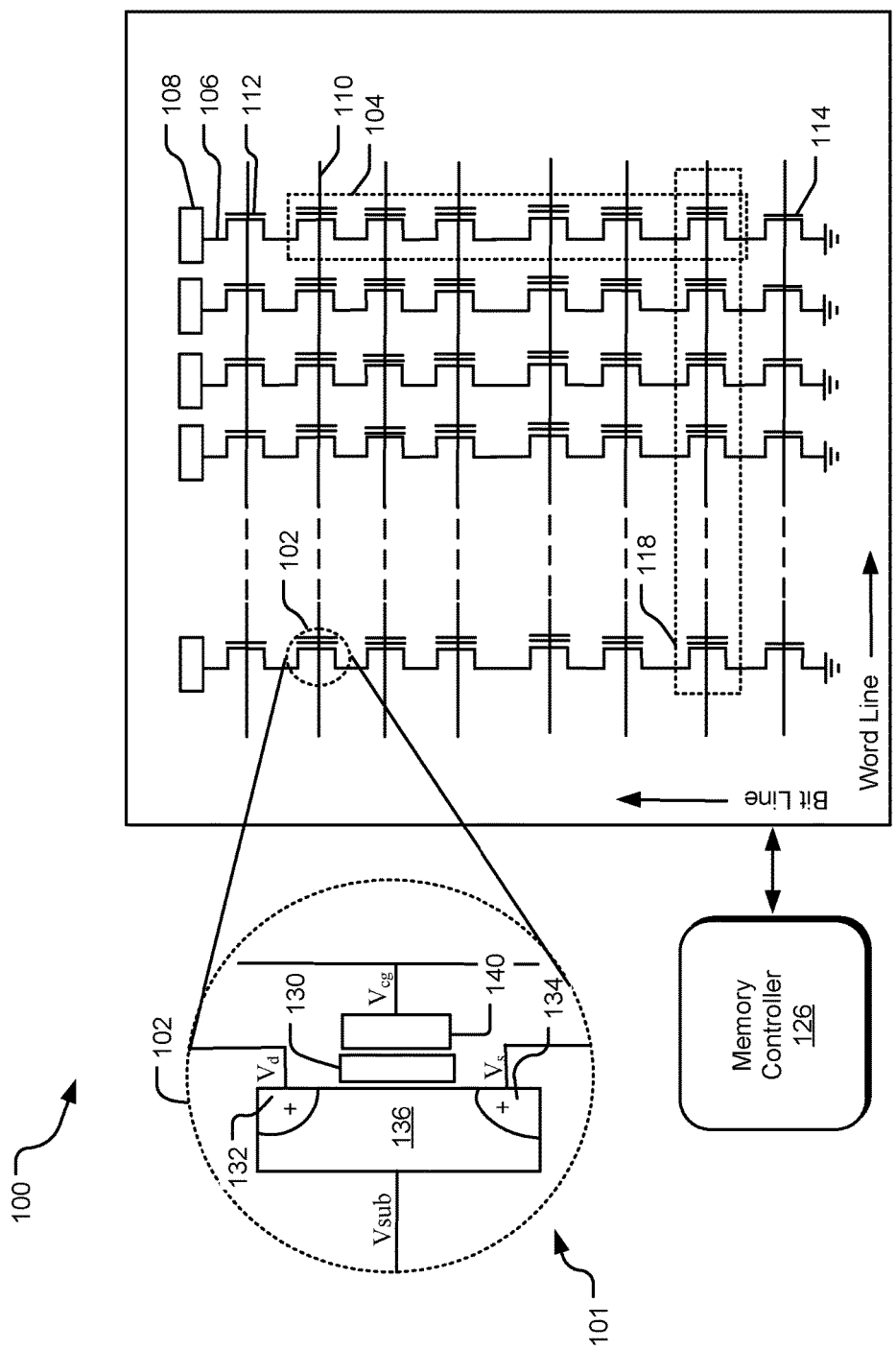
FIG. 1 illustrates an example memory controller for providing scheduled memory access operation suspend/resume control for a memory array.

FIG. 1 illustrates an example memory controller 126 for providing scheduled memory access operation suspend/resume control for a memory array 100 (also referred to as a data array). The memory array 100 includes memory cells (e.g., a memory cell 102) that are programmable via different incremental step pulse program (ISPP) voltages. The memory cells of the memory array comprise a plurality of floating-gate transistor memory cells connected in series, in what are generally referred to as NAND strings. This type of memory array 100 is known as NAND flash memory. It should be understood that NAND flash is merely one example type of memory suitable for use with the disclosed technology.

Each NAND string is coupled to a bitline (e.g., a bitline 106 from which a symbol can be read via an output bus (e.g., bus 108)). The cells of adjacent NAND strings are coupled via wordlines (e.g., wordline 110) that select which row of memory cells are affected by reading and programming operations. Select gates 112, 114 also selectably couple the NAND strings to respective bitlines and ground during reading and program operations. Generally, each wordline may be associated with one or more pages (e.g., page(s) 118), which are the smallest physically addressable data unit. The size of the page in bits (which may include both user data and error correction codes, or ECC) corresponds to the number of NAND strings in the wordline. An MLC memory array stores multiple pages on a wordline by encoding corresponding bits (e.g., all bit 0's from each page) into a unique charge level within each cell.

Flash memory retains state by charging a floating gate to a particular voltage. This results in a predefined amount of current flowing through the channel when a specified read voltage is applied. An expanded view 101 of the memory cell 102 illustrates a flash memory cell transistor. The flash memory cell transistor includes a source region 134 and a drain region 132 located at a surface of a substrate 136. A gate structure is aligned over a channel region defined between the source region 134 and the drain region 132. The gate structure includes a floating gate 130 and a control gate 140. Although not shown, a tunneling dielectric layer is interposed between the floating gate 130 and the surface of the substrate, and another thin oxide layer or control dielectric is interposed between the floating gate 130 and the control gate 140. In the illustrated example, the drain voltage $V_d$ is supplied from a bit line BL and the control gate voltage $V_{cg}$ is supplied from a word line WL, and the source voltage $V_s$ is connected to a reference potential such as ground.

In order to change (program) a memory cell transistor from an initial state to a programmed state, a process known as Fowler-Nordheim (FN) tunneling is utilized. Briefly, a relatively large positive potential difference is created between the control gate 140 and the substrate 136, and excited electrons within the channel on the surface of the substrate 136 are pushed through and trapped in the floating gate 130. These negatively charged electrons act as a barrier between the control gate 140 and channel on the substrate 136, increasing the threshold voltage of the memory cell transistor. The memory cell transistor can be brought back to its initial state by forming a large negative potential difference between the control gate 140 and the substrate, which draws electrons back across the thin oxide layer between the floating gate 130 and the substrate 136, thus removing the electron barrier and decreasing the threshold voltage of the memory cell 102.

In a single level cell (SLC) storage device, each memory cell transistor stores a voltage that corresponds to one of two possible memory states (0' or '1'). For example, the memory state '0' may correspond to a first range of voltages and the memory state '1' may correspond to a second range of voltages.

In a multi-level cell (MLC) storage device, each memory cell transistor stores two or more bits of data and the memory cell transistor can assume any of a range of possible voltages that each represent a different one of the possible combinations of 1s and 0s. If, for example, each memory cell transistor stores two bits of data, then the memory cell transistor may have a voltage that falls within one of four different voltage ranges corresponding to the states 00, 01, 10, and 11, respectively. In addition, a memory cell transistor in a triple-level cell (TLC) storage device stores three bits per cell, and a memory cell transistor in a quad-level cell (QLC) storage device stores four bits per cell.

Incremental step pulse programming (ISPP) is one approach for programming memory states in MLC and SLC transistors. A program memory access operation acts as a write to memory. In ISPP, a program voltage is applied to the control gate of a selected memory cell using short successive program pulses of increasing magnitude. If, for example, a page is selected for a programming operation, a bias voltage is applied to wordlines to which the memory cells of the page are connected. The ISPP programming method programs the selected page several times while gradually increasing a word line bias voltage on a step-voltage basis.

Between each pulse of increased "step" voltage, a program verify operation is performed to check whether the selected memory cell's threshold voltage has risen above a program verify voltage level. The ISPP process continues until the threshold voltage of each of the selected memory cells (e.g., the cells of the page 104) rises above the program verify level.

By requiring the selected memory cell's threshold voltage to exceed a program verify voltage level, the ISPP process effectively controls a lower bound for a threshold voltage distribution for each possible programmed state of the selected memory cell. By applying the program voltage to the control gate in short pulses, the ISPP process prevents the threshold voltage of the selected memory cell from increasing significantly beyond the program verify voltage level, thereby maintaining a reasonable upper bound on the threshold voltage distribution for each programmed state of the memory cell.

Program operations can be very lengthy, especially in comparison to read operations. Accordingly, the memory controller 126 in the described technology schedules the suspending and resuming of a program operation (or other lower priority memory access operations) in favor of various types of read operations (or other higher priority memory access operations). In this manner, higher priority operations are less likely to be blocked by long, lower priority operations.

In 3D NAND, a one-shot programming algorithm is often employed, where all pages in a wordline are being programmed essentially together. Therefore, the program time in 3D NAND can be long compared to the read time, and in particular longer than in planar or 2D NAND. In planar NAND, a multi-step programming algorithm is typically employed, where pages are programmed independently from each other. In 3D NAND, programming time increases with the number of bits stored per cell, as there are more pages per wordline. Therefore, program times for TLC and QLC NAND are typically higher than for MLC 2 bit/cell NAND. To achieve good performance and quality of service characteristics, suspend program operations allow for pre-emptive read operations as described below.

Figure 2:
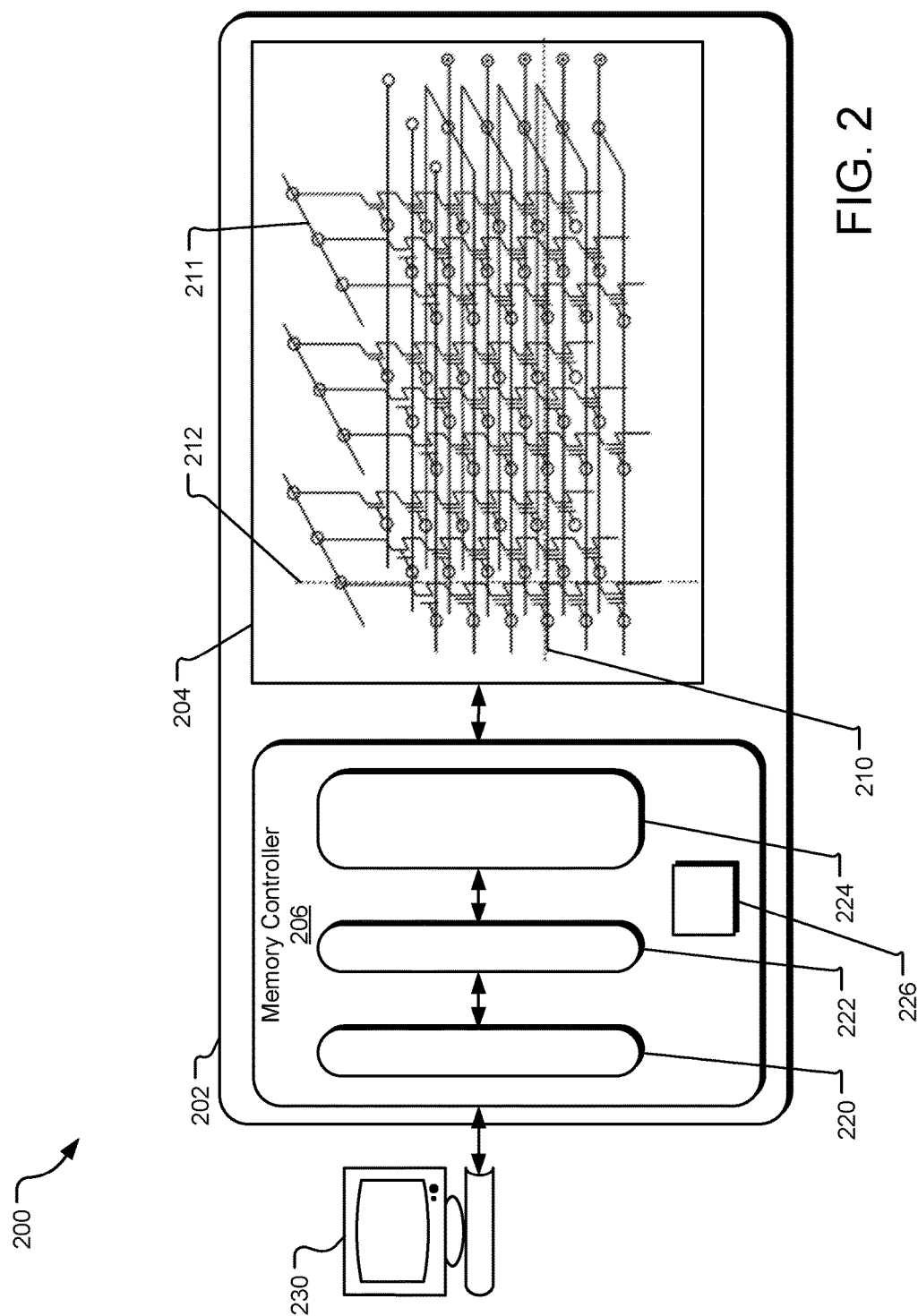
FIG. 2 illustrates an example of a memory device including a memory array suitable for storing data in at least three dimensions.

FIG. 2 illustrates an example system 200 including a host 230 and a solid-state storage device 202. The solid-state storage device 202 includes one or more memory arrays (e.g., a memory array 204, also referred to as a data array) suitable for storing data in at least three dimensions. This type of memory block includes a 3D NAND block that includes cells of adjacent NAND strings coupled via wordlines (e.g., a wordline 210), and also includes select gates that selectably couple the NAND strings to respective bitlines (e.g., a bitline 211). A third dimension of memory cells, referred to as the channel string (212), is selected by activating a corresponding bitline and a corresponding channel selection line. In 3D NAND flash, the collection of wordline direction is also sometimes referred to as a wordline plane. The scrambling methodology described below yields three-dimensional data randomization in each of the bitline (BL), wordline (WL), and channel select line (CSL) directions.

A host 230 can issue instructions for memory access operations, such as read, write, and erase operations, to a memory controller 206 to read/write data to the memory array 204. In addition, the memory controller 206 can also execute memory access operations without explicit instructions from the host 230. For example, the memory controller 206 may issue retry read operations, recycle read operations, remapping read operations, and remapping program operations.

Each type of operation, and in some implementations, individual memory access operations themselves, may be designated with a priority level, whether by the host or by the memory controller configuration. For example, the memory controller configuration may designate certain read operations as having higher priorities than certain program operations. In this manner, the memory controller 206 can schedule the suspending and resuming of a lower priority program operation in favor of one or more read operations. In at least one implementation, any host read command to a memory array and marked as high priority (e.g., by firmware) that arrives in any memory access interval will trigger a suspend command to that memory array after the current memory access interval completes, if that memory array is busy with another memory access operation of a lower priority.

In one implementation, the memory controller 206 is implemented in circuitry (e.g., as an ASIC), including front-end interface circuit 220, a virtualization circuit 222, and a media engine circuit 224. The front-end interface circuit 220 communicates host memory access operation instructions and data with the host 230. The virtualization circuit 222 translates between virtual memory addresses and physical memory addresses in the numerous memory arrays of a solid-state storage device. The media engine circuit 224 includes a flash media engine (FME) circuit and individual flash translation interface (FTI) circuits for each channel, which provide the control and data communication for the various memory access operations to individual memory arrays in the solid-state storage device. Example memory access operations may include without limitation read, program, and erase operations.

In various implementations, the media engine circuit 224 schedules suspend and resume actions according to the processes described herein. The media engine circuit 224 accesses device configuration parameters stored in a device configuration memory 226 (e.g., a device configuration files stored in such memory 226) to adjust the timings and counts used in the processes. In some implementations, firmware controlling the suspend/resume functionality can access such device configuration parameters to allow changes to the operation of the suspend/resume functionality without rebuilding and re-installing the firmware. Example parameters may include without limitation a maximum number of suspends allowed during a predesignated time or for a predesignated number of memory access operations, the size of a timed suspend extension window, the size of a memory access operation interval, and relative priorities of different memory access operations or types of memory access operations.

It should be understood that, in some implementations, suspending and resuming may be nested. For example, a first memory access operation is suspended to allow a second (higher priority) memory access operation to execute. Subsequently, while the first memory access operation is suspended, the second (higher priority) memory access operation is suspended to allow a third (even higher priority) memory access operation to execute. The number of nested suspending levels need not be limited to any particular number, and each level of suspending may allow multiple higher priority memory access operations to complete before resuming the suspended operation. Resuming the suspended operations is performed in the reverse order as compared to the suspending. Other limits on the number of suspend/resume levels, amounts of suspend time, number of suspends, etc. may also be employed. In one example, the first memory access operation is an erase operation, the second memory access operation is a program operation (with a priority that is higher than that of the erase operation), and the third memory access operation is a read operation (with a priority that is higher than those of the erase and read operations).

Figure 3:
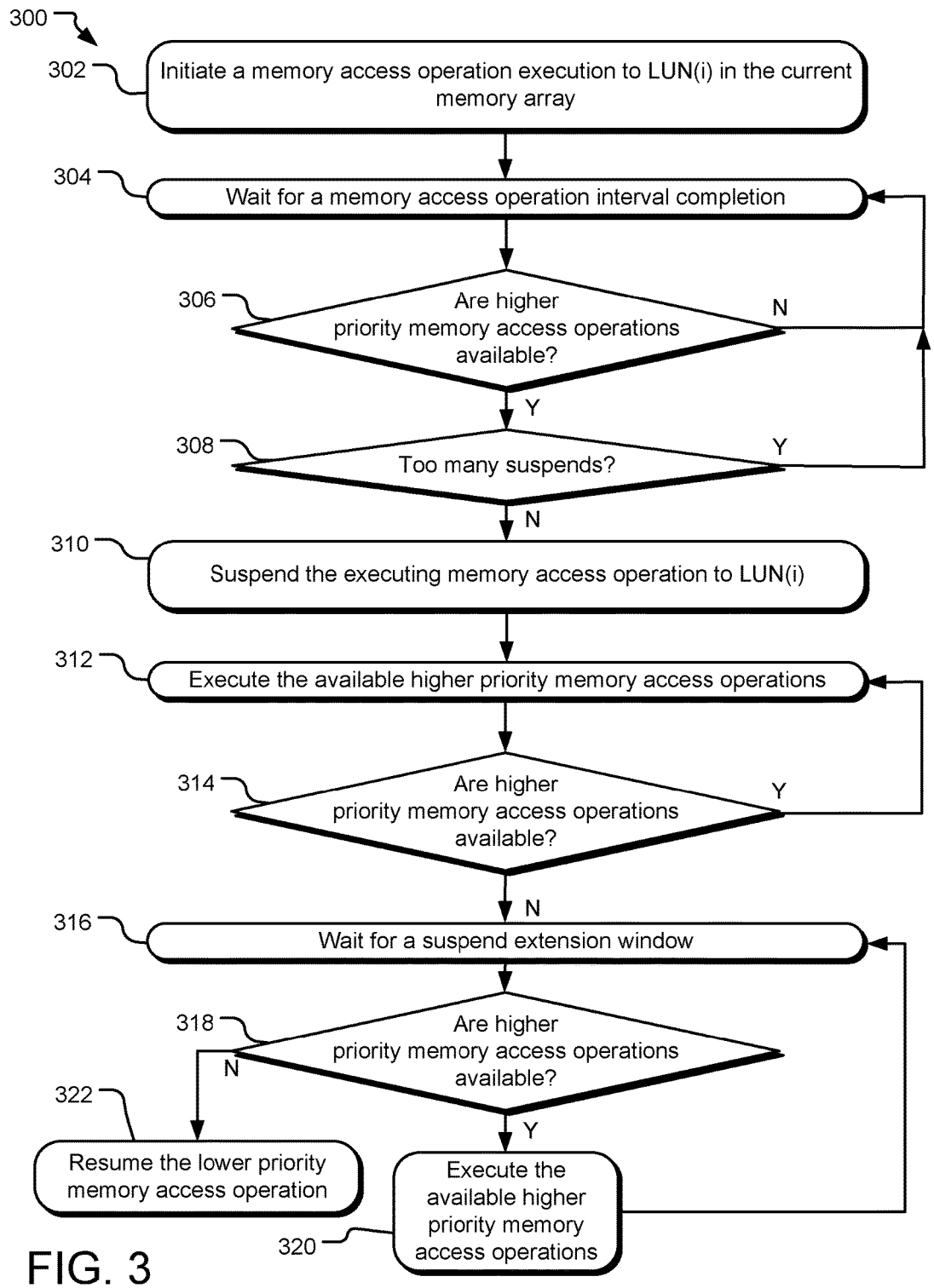
FIG. 3 illustrates example operations for scheduling and implementing suspensions and resumptions of memory access operations.

FIG. 3 illustrates example operations 300 for scheduling and implementing suspensions and resumptions of memory access operations. An initiating operation 302 initiates a memory access operation to a LUN(i) (Logical Unit Number) in the current memory array. The memory access operation is attributed with a priority and is divided into a sequence of intervals, which are set up to allow safe suspension of the memory access operation at the completion of each interval. In some implementations, the intervals are equally-sized, although other implementations may employ differently-sized intervals. Also, in some implementations, the intervals are timed, based on a timer that sets the beginning and end of the interval. A delay operation 304 waits until a currently-executing memory access operation interval completes after the initiating operation 302. The delay operation 304 ensures that the memory access operation is not suspended at an unsafe point in its execution. Equally-sized intervals also provide predictability of read time latency, which is beneficial for quality of service performance.

A decision operation 306 determines whether at least one higher priority memory access operation is available for execution in the current memory array. In one implementation, the decision operation 306 may evaluate a queue to which various read, program, and erase requests for the current memory array are added. In one example, the initiating operation 302 may execute a program operation having a first priority, and the decision operation 306 may determine that one or more read operations have been received in the queue and have higher priorities than the first priority. If no higher priority memory access operations are available for execution in the current memory array, then processing loops back to the delay operation 304 again to continue execution of the memory access operation. It should be understood that various memory access operations may be reordered in one or more queues, such as to push higher priority memory access operations to the front of a queue while maintaining lower priority memory access operations farther back in the queue. In this manner, higher priority memory access operations may be made available ahead of memory access operations having lower priorities If one or more higher priority memory access operations are available for execution in the current memory array, another decision operation 308 determines whether too many suspends have been issued in this memory array, such as too many suspends to the same memory access operation, over a period of time in the same memory array, etc. If so, then processing loops back to the delay operation 304 again to continue execution of the memory access operation. Otherwise, a suspend operation 310 suspends the currently executing memory access operation to LUN(i), and an execution operation 312 executes the one or more higher priority available memory access operations. A decision operation 314 determines whether one or more higher priority memory access operations are available for execution in the memory array. If so, processing loops back to execution operation 312.

When no higher priority memory access operations are available for execution in the memory array, another delay operation 316 waits for a timed suspend extension window to expire. Another decision operation 318 determines whether one or more higher priority memory access operations are available for execution in the memory array. Such operations are considered "newly-available" because they became available during the timed suspend extension window. If one or more newly-available memory access operations are available for execution in the current memory array, then an executing operation 320 executes those newly-available memory access operations, and processing returns to the delay operation 316. Otherwise, a resuming operation 322 resumes execution of the lower priority memory operation at the next interval in the sequence of intervals of the lower priority memory operation.

The application of operation priorities can vary based on design objectives. For example, in some implementations, any read operation will have a higher priority than a program or erase operation. In other implementations, read retry operations do not block a resuming of a suspended memory access operation, but otherwise, they are treated like any other read operation. Many other variations are contemplated. Relative priorities of memory access operations may vary depending on the device configuration parameters and instructions from the host and storage device.

The following provides some specific examples of how memory access operations having different priorities may be handled, although other variations may be employed:
  Suspending memory access operations that will suspend a
    program operation if present in the queue
    Host read operations
    Map read operations (if a map entry is not cached),
      where "map" refers to the metadata that stores the
      mapping between logical and physical addresses
    Checkpoint read operations (e.g., read operations of
      metadata) that allow recovery a drive from a power
      event or power failure
  Non-suspending memory access operations that execute
    during a suspend if they arrived or are in the queue
    during a suspend (but will not trigger a suspend)
    Recycle read operations
    All error recovery and flash policy read operations
      (such as read operations during background scrub
      and code rate test operations)

Background read operations to calibrate and tune parameters of the SSD such as read reference voltages, error correction code, and code rate settings, to deal with a first read effects, etc.

Figure 4:
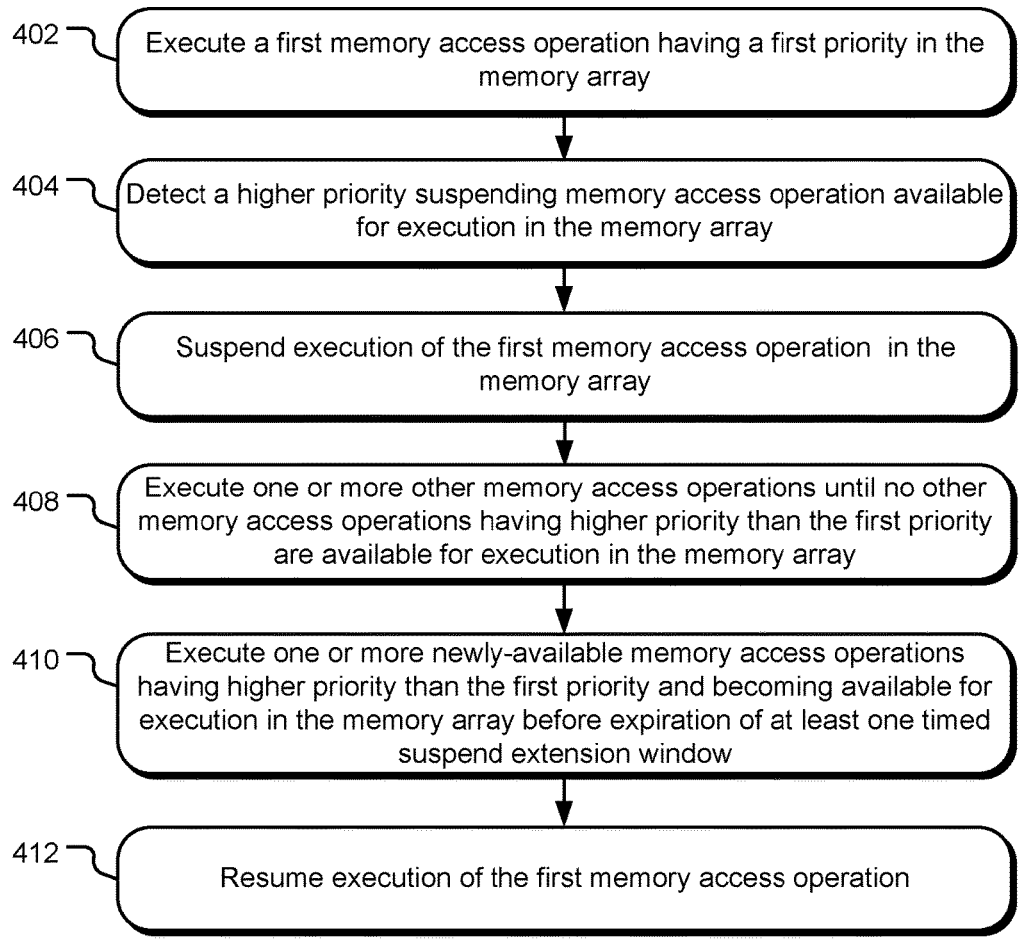
FIG. 4 illustrates example operations for managing memory access operation suspension and resumption.

Resume-triggering (low priority) read operations that are not allowed to trigger a suspend or execute during a suspend and would cause a program operation to resume if suspended Root file system read operations FIG. 4 illustrates example operations 400 for managing memory access operation suspension and resumption. An execution operation 402 executes a first memory access operation in a memory array. The first memory access operation has a first priority. A detection operation 404 detects at least one suspending memory access operation available for execution in the memory array and having a higher priority than the first priority. The detection operation 404 also distinguishes between suspending memory access operations and non-suspending memory access operations (and resume-triggering memory access operations in some implementations). A suspending operation 406 suspends execution of a currently-executing memory access operation if it is determined that at least one higher priority suspending memory access operations are available for execution in the memory array. If one or more non-suspending memory access operations are detected as available and having higher priorities than the first priority, but no suspending memory access operations are detected as available and having higher priorities than the first priority, then the suspending operation 406 does not execute. In one implementation, the suspending operation 406 waits until the currently-executing interval of the memory access operation completes before initiating the suspension.

An execution operation 408 executes the available higher priority memory access operations, including new higher priority memory access operations that become available after the suspending operation 406 completes. The execution operation 408 completes when no additional higher priority memory access operations are available for execution in the memory array. Another execution operation 410 executes, after expiration of a timed suspend extension window, any newly-available higher priority memory access operations made available during the timed suspend extension windows. The execution operation 410 can also repeat through multiple timed suspend extension windows until no higher priority memory access operations are available at the end of the timed suspend extension windows. A resuming operation 412 resumes execution of the lower priority memory access operation. In some implementations, the execution operation 410 may be omitted.

In some implementations, one or more resume trigger conditions may be set to resume the suspended memory access operation before completion of either the execution operation 408 or the execution operation 410. For example, the resume trigger condition may be set to expiration of a timer, such that the execution operation 408 completes when the memory controller detects that the expiration of the timer, rather than when the memory controller detects that no additional higher priority memory access operations available for execution in the memory array. In another example, the resume trigger condition may be set to a maximum higher priority memory access operation count, such that the execution operation 408 completes when the memory controller detects that the number of higher priority memory access operations executing during the suspend meets or exceeds the maximum higher priority memory access operation count, rather than when the memory controller detects that no additional higher priority memory access operations are available for execution in the memory array. In yet another example, the resume trigger condition may be set to a desired ratio of executed higher priority memory access operations (e.g., over a period of time) to lower priority memory access operations (e.g., over the period of time), such that the execution operation 408 completes when the memory controller detects that the ratio of executed higher priority memory access operations to executed lower priority memory access operations meets or exceeds a predetermined maximum threshold, rather than when the memory controller detects that no additional higher priority memory access operations are available for execution in the memory array If, before completion of the execution operation 408, a resume-triggering memory access operation is detected as available for execution in the memory array, even if its priority is lower than a higher priority memory access operation executing during the suspend, the executing memory access operation is terminated, and the execution of the first memory access operation is resumed in the resuming operation 412.

Such resume-triggering conditions may also be applied to preempt or prematurely terminate the execution operation 410 and trigger the resuming operation 412. Other preemptive resume conditions are contemplated.

Figure 5:
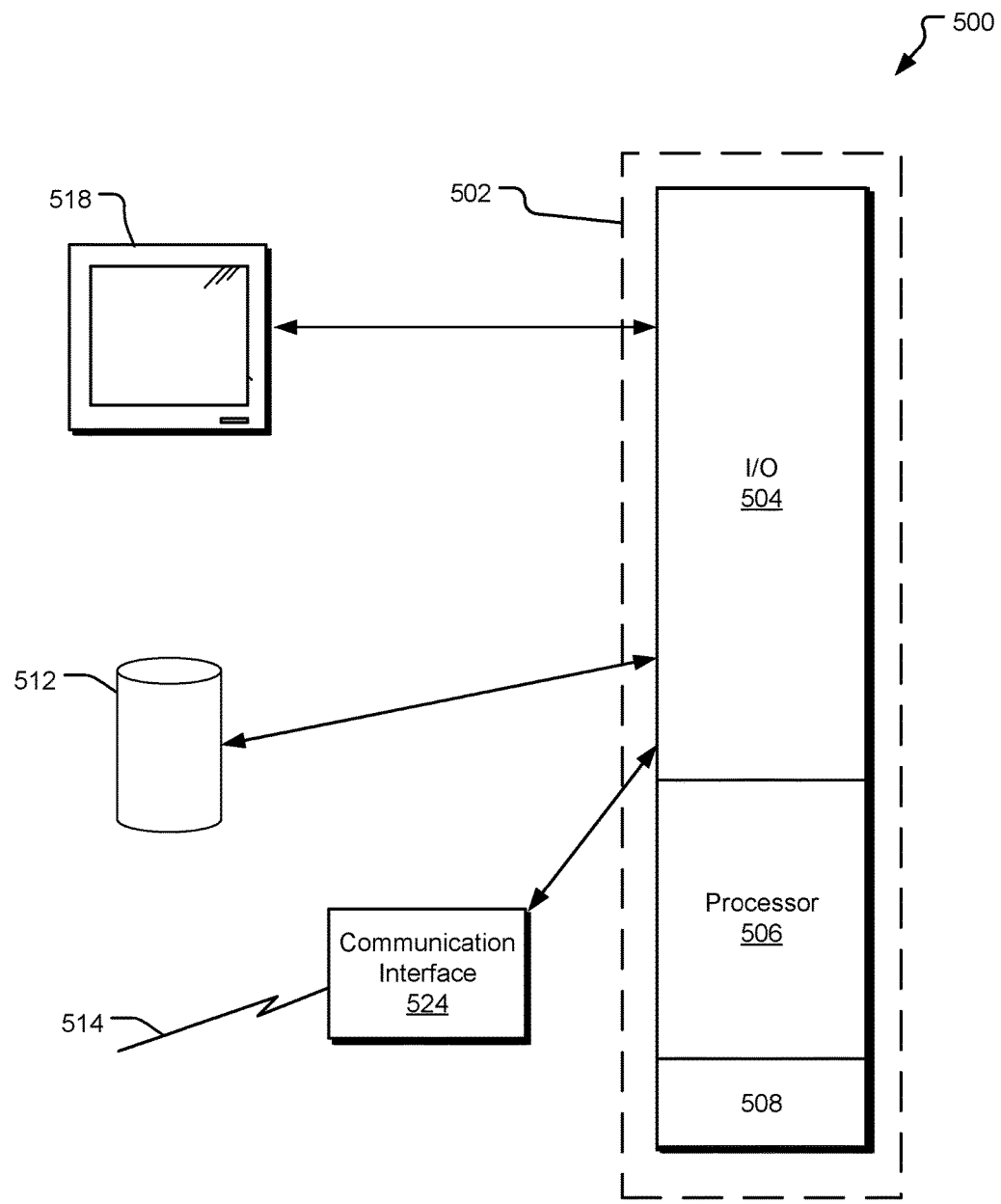
FIG. 5 illustrates an example processing system that may be useful in implementing the technology described herein.

FIG. 5 illustrates an example processing system 500 that may be useful in implementing the described technology. The processing system 500 is capable of executing a computer program product embodied in a tangible computer-readable (or processor-readable) storage medium to execute a computer process. Data and program files may be input to the processing system 500, which reads the files and executes the programs therein using one or more processors (e.g., CPUs, GPUs, ASICs). Some of the elements of a processing system 500 are shown in FIG. 5 wherein a processor 502 is shown having an input/output (I/O) section 504, one or more processors 506, and a memory 508. The one or more processors 506 may comprise a one or more processing devices or cores. The processors may be single core or multi-core processors. The processing system 500 may be a conventional computer, a distributed computer, a controller board, an ASIC, or any other type of processing system. The described technology is optionally implemented in software loaded in memory 508, a storage unit 512, and/or communicated via a wired or wireless network link 514 on a carrier signal (e.g., Ethernet, 3G wireless, 5G wireless, LTE (Long Term Evolution)) thereby transforming the processing system 500 in FIG. 5 to a special purpose machine for implementing the described operations. The processing system 500 may be an application specific processing system configured for supporting the disc drive throughput balancing system disclosed herein.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, firmware controlling the memory controller and other modules may be embodied by processor-executable instructions stored in memory 508 and/or the storage unit 512 and executed by the processor 502. Further, the storage controller may be configured to assist in supporting the RAID0 implementation. A RAID storage may be implemented using a general-purpose computer and specialized software (such as a server executing service software), a special purpose computing system and specialized software (such as a mobile device or network appliance executing service software), or other computing configurations. In addition, interval sizes, priorities, read/program data, and other data and parameters may be stored in the memory 508 and/or the storage unit 512 and executed by the processor 502.

The processing system 500 may be implemented in a device, such as a user device, storage device, IoT device, a desktop, laptop, computing device. The processing system 500 may be a storage device that executes in a user device or external to a user device.

The processing system 500 may include a variety of tangible processor-readable storage media and intangible processor-readable communication signals. Tangible processor-readable storage can be embodied by any available media that can be accessed by the processing system 500 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 500. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of managing memory access operations through a flash memory interface of a memory array of a solid-state storage device connected to a host, the method comprising:
   executing a first memory access operation in the memory array, the first memory access operation having a first priority;
   detecting at least one suspending memory access operation available for execution in the memory array and having a higher priority than the first priority, the detecting operation distinguishing between suspending memory access operations and non-suspending memory access operations;
   suspending execution of the first memory access operation in the memory array, responsive to the detecting operation;
   executing the at least one suspending memory access operation, responsive to the suspending operation;
   after executing the at least one suspending memory access operation, executing one or more newly-available memory access operations in the memory array having higher priorities than the first priority and becoming available for execution in the memory array before expiration of at least one timed suspend extension window, the at least one timed suspend extension window starting after termination of the operation of executing the at least one suspending memory access operation; and
   resuming the execution of the first memory access operation in the memory array, responsive to completing the executing operation, the executing the one or more newly-available memory access operations starting prior to the resuming operation.

2. The method of claim 1 wherein the operation of executing one or more newly-available memory access operations in the memory array is performed iteratively for multiple timed suspend extension windows while the first memory access operation remains suspended.

3. The method of claim 1 wherein the first memory access operation is divided into a sequence of intervals, the first memory access operation executes in an executing interval of the intervals prior to suspension, and the suspending operation comprises:
   delaying suspension of the first memory access operation until the executing interval of the first memory access operation completes; and
   suspending the execution of the first memory access operation in the memory array after completion of the executing interval of the first memory access operation.

4. The method of claim 3 wherein a next interval follows the executing interval in the sequence of intervals, the resuming operation comprises:
   resuming the execution of the first memory access operation in the memory array at the next interval of the sequence.

5. The method of claim 1 wherein the first memory access operation is a program operation, and at least one of the other memory access operations having higher priorities than the program operation is a host read operation.

6. The method of claim 1 wherein nested levels of suspending and resuming are performed for multiple levels of higher priority memory access operations.

7. A system for managing memory access operations in a solid-state storage device connected to a host, the system comprising:
   one or more memory arrays; and
   a flash memory interface including a memory controller coupled to the one or more memory arrays and being configured to:
      execute a first memory access operation in a memory array of the one or more memory arrays, the first memory access operation having a first priority,
      detect at least one suspending memory access operation available for execution in the memory array and having a higher priority than the first priority, the detect operation distinguishing between suspending memory access operations and non-suspending memory access operations,
      suspend execution of the first memory access operation in the memory array, responsive to the detect operation,
      execute the at least one suspending memory access operation, responsive to suspending the execution of the first memory access operation,
      detect at least one resume trigger condition, wherein the at least one resume trigger condition is:
         a total number of suspending memory access operations executing during the suspend execution operation reaching or exceeding a predetermined threshold number of suspending memory access operations; or
         a ratio of executed higher priority memory access operations to executed lower priority memory access operations reaching or exceeding a predetermined threshold ratio; and
      resume the execution of the first memory access operation in the memory array, responsive to detection of the at least one resume trigger condition and before completion of the execute operation.

8. The system of claim 7 wherein the memory controller comprises:
   a timer starting at least one timed suspend extension window after termination of the operation of executing the at least one memory access operation, and the memory controller is further configured to execute prior to the resume operation one or more newly-available memory access operations in the memory array having higher priorities than the first priority and becoming available for execution in the memory array before expiration of the at least one timed suspend extension window.

9. The system of claim 8 wherein the first memory access operation is divided into a sequence of intervals, each interval being longer in time than the at least one timed suspend extension window, and the first memory access operation executes in an executing interval of the intervals prior to suspension, and the memory controller is further configured to perform the suspend operation by:
   delaying suspension of the first memory access operation until the executing interval of the first memory access operation completes, and
   suspending the execution of the first memory access operation in the memory array after completion of the executing interval of the first memory access operation.

10. The system of claim 9 wherein a next interval follows the executing interval in the sequence of intervals, and the memory controller is further configured to resume the execution of the first memory access operation by resuming the execution of the first memory access operation in the memory array at the next interval of the sequence.

11. The system of claim 7 wherein the memory controller is further configured to execute one or more newly-available memory access operations in the memory array iteratively for multiple timed suspend extension windows while the first memory access operation remains suspended.

12. The system of claim 7 wherein the first memory access operation is a program operation, and at least one of the other memory access operations having higher priorities than the program operation is a host read operation.

13. The system of claim 7 wherein memory access operations having higher priorities are made available ahead of memory access operations having lower priorities.

14. One or more tangible processor-readable storage media encoding processor-executable instructions for executing on a processor a process of managing memory access operations through a flash memory interface of a memory array of a solid-state storage device connected to a host, the process comprising:

executing a first memory access operation in the memory array, the first memory access operation having a first priority;
 detecting at least one suspending memory access operation available for execution in the memory array and having a higher priority than the first priority, the detecting operation distinguishing between suspending memory access operations and non-suspending memory access operations;
 suspending execution of the first memory access operation in the memory array, responsive to the detecting operation;
 executing the at least one suspending memory access operation, responsive to the suspending operation;
 after executing the at least one suspending memory access operation, executing one or more newly-available memory access operations in the memory array having higher priorities than the first priority and becoming available for execution in the memory array before expiration of at least one timed suspend extension window, the at least one timed suspend extension window starting after termination of the operation of executing the at least one suspending memory access operation, and
 resuming the execution of the first memory access operation in the memory array, responsive to completing the executing operation, the executing the one or more newly-available memory access operations starting prior to the resuming operation.

15. The one or more tangible processor-readable storage media of claim 14 wherein the first memory access operation is a program operation, and at least one of the other memory access operations having higher priorities than the program operation is a host read operation.

16. The one or more tangible processor-readable storage media of claim 14 wherein the first memory access operation is a program operation, and at least one of the other memory access operations having higher priorities than the program operation is a map read operation.

* * * * *